US007797405B2

(12) United States Patent
Morrissey et al.

(10) Patent No.: US 7,797,405 B2
(45) Date of Patent: Sep. 14, 2010

(54) STREAMING FILE TRANSFER APPARATUS, SYSTEMS, AND METHODS

(75) Inventors: Jeremy Morrissey, Rancho Cordova, CA (US); Stephen Piccolo, Higley, AZ (US); Brandon Bohling, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 1323 days.

(21) Appl. No.: 11/287,607

(22) Filed: Nov. 28, 2005

(65) Prior Publication Data

US 2007/0121585 A1 May 31, 2007

(51) Int. Cl.
*G06F 15/177* (2006.01)
(52) U.S. Cl. .................. 709/220; 709/203; 709/223; 709/230
(58) Field of Classification Search .......... 709/203, 709/220, 223, 230
See application file for complete search history.

(56) References Cited

U.S. PATENT DOCUMENTS

| 6,801,604 | B2* | 10/2004 | Maes et al. ............. | 379/88.17 |
|---|---|---|---|---|
| 7,171,475 | B2* | 1/2007 | Weisman et al. ......... | 709/227 |
| 7,702,795 | B2* | 4/2010 | Zintel et al. ............ | 709/227 |
| 2005/0021799 | A1* | 1/2005 | Imamura et al. .......... | 709/230 |
| 2006/0265689 | A1* | 11/2006 | Kuznetsov et al. ........ | 717/117 |

OTHER PUBLICATIONS

"Altova Tools for Web Services", http://www.altova.com/dev_portal_web_services.html, (observed Jun. 7, 2006), 2 pgs.
"House of Web Services: Moving to .NET and Web Services", http://msdn.microsoft.com/msdnmag/issues/01/11/webserv/print.asp, (observed Jun. 7, 2006), 16 pgs.
"Soap: The Simple Object Access Protocol", http://web.archive.org/web/20041119090611/http://www.microsoft.com/mind/0100/soap/soap.asp, (archived Nov. 11, 2004), 13 pgs.
"Web Services Enhancements (WSE)", http://msdn.microsoft.com/webservices/webservices/building/wse/default.aspx, (observed Jun. 6, 2006), 6 pgs.
"What's New in Web Services Enhancements 3.0", http://msdn.microsoft.com/webservices/webservices/building/wse/default.aspx/library/en-us/dnwse/html/newwse3.asp,(observed Jun. 6, 2006), 24 pgs.
"XESOS Technology Platform (XML EventStream Operating System)—XML Processing -Sarvega", http://sarvega.com/technology.html, (observed Jun. 6, 2006),1 pg.

* cited by examiner

*Primary Examiner*—Michael Won
(74) *Attorney, Agent, or Firm*—Schwegman, Lundberg & Woessner, P.A.

(57) ABSTRACT

Apparatus, systems, and methods may operate to receive a stream of packets, including perhaps a stream of hypertext transport protocol (HTTP) packets, at a server. The stream of HTTP packets may comprise a data message and a control message. Both messages may be encoded in a computing platform independent protocol, including perhaps a simple object access protocol (SOAP). A SOAP decoder may extract the data message from the SOAP. The data message may be extracted and stored while receiving the stream of HTTP packets. Other embodiments are described and claimed.

21 Claims, 4 Drawing Sheets

STREAMING FILE TRANSFER APPARATUS, SYSTEMS, AND METHODS

TECHNICAL FIELD

Various embodiments described herein relate to networking generally, including apparatus, systems, and methods used to stream simple object access protocol-encoded messages between and within networks.

BACKGROUND INFORMATION

A need may exist in business-to-business (B2B) transactions to transfer large files and messages. A file transfer protocol (FTP) may be used to transfer large files. However FTP may be considered insecure, since passwords associated with FTP may be sent in clear text over a communications medium. Another potential problem with FTP is that an enterprise infrastructure firewall may filter packets associated with an FTP network port. Although dedicated networks can be used for B2B transactional messaging, such solutions may be costly if a large number of B2B relationships is to be supported.

DETAILED DESCRIPTION

Figure 1:
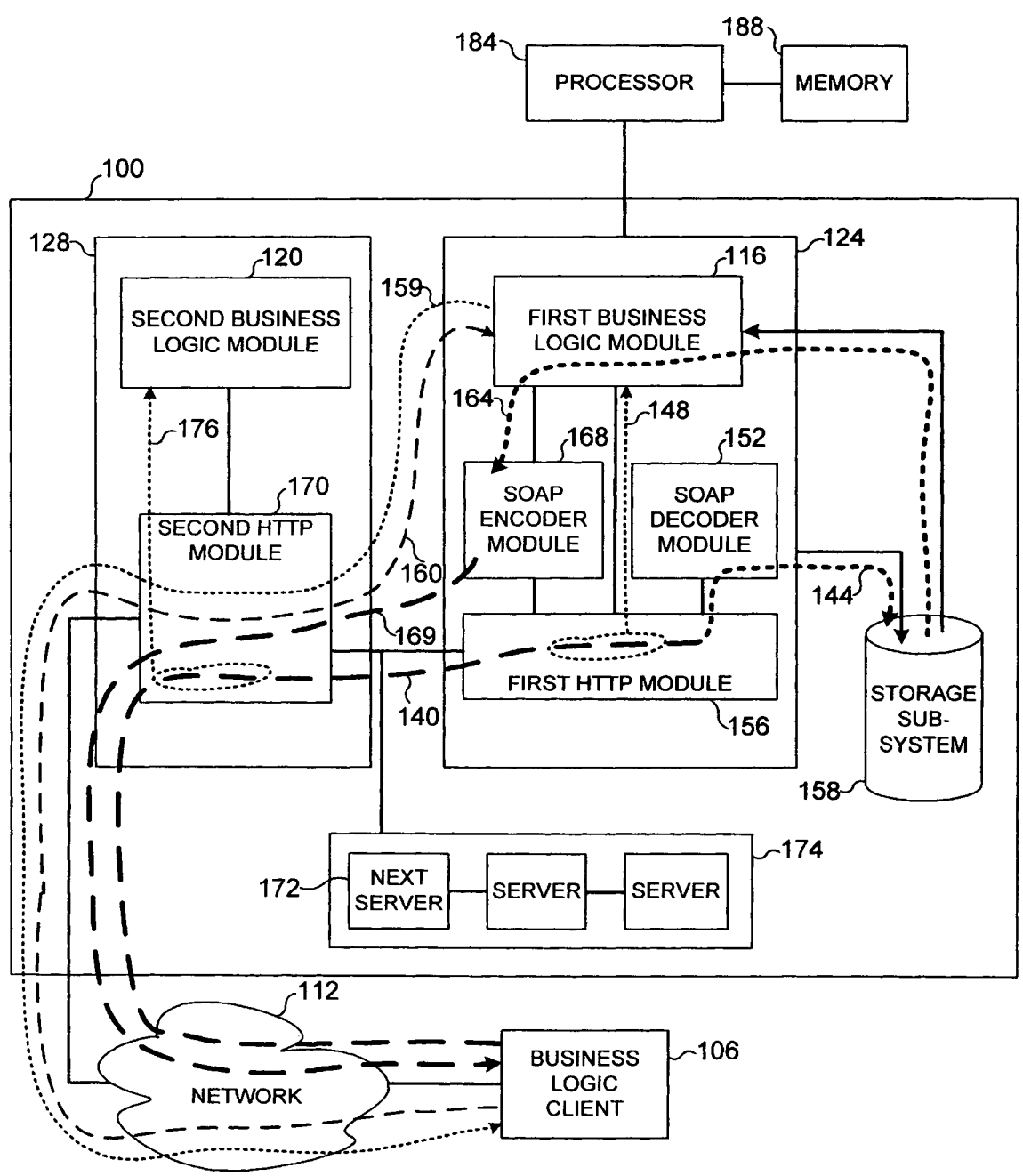
FIG. 1 is a block diagram of an apparatus and a representative system according to various embodiments of the invention.

FIG. 1 comprises a schematic diagram of an apparatus 100 and a system 180 according to various embodiments of the invention. A business logic client 106 may communicate across a network 112 with one or more business logic modules 116 and 120. "Business logic," in this context, means software components made available over an intranet, an extranet, or the Internet. Business logic applications written in diverse programming languages and executing on different computing platforms may be capable of exchanging data seamlessly. The business logic module(s) 116 and 120 may be located on one or more servers 124 and 128, perhaps at a location remote from the business logic client 106. In some embodiments of the invention, the business logic module(s) 116 and 120 may comprise extended markup language (XML) web services facilities. The business logic module(s) 116 and 120 may communicate with the business logic client 106 using a simple object access protocol (SOAP). Additional information regarding SOAP may be found in an evolving standard from the World Wide Web Consortium XML Protocol Working Group, SOAP Version 1.2 Part 1: Messaging Framework W3C Recommendation (24 Jun. 2003) at http://www.w3.org/TR/soap12-part1/.

XML web services using hypertext transport protocol (HTTP) may be allowed through firewalls within a network demilitarized zone (DMZ), generally but not necessarily on ports 80 and 443. This may enable the use of XML web services-based applications while maintaining security restrictions imposed by the DMZ. Embodiments of the invention may utilize components of a Microsoft® software .Net™ framework and Internet Information Services software, among other components, to stream XML web services messages through one or more systems. Some embodiments may permit streaming a long HTTP-based message or large file from one server to another within a set of servers. The message or file may be streamed through the set of servers without writing the message or file to disk until reaching an endpoint server. The phrase "chain of servers" may be used interchangeably herein with "set of servers." The messages and files may be efficiently streamed across a web server farm using components of the invention.

Embodiments of the invention may provide a software hook for applications to plug into a communications pipeline. The pipeline may extend from a server, including perhaps a server associated with an enterprise network, to a connecting network. Messages of various formats may be supported across the pipeline. Embodiments of the invention may enable an application to conform to communications standards including SOAP, base64 encoding of a file wrapped in a SOAP message body, and SOAP message transmission optimization method (MTOM), among others.

Message sizes may be supported independently from a size of random access memory available on a server in the chain of servers. Streaming architecture associated with some embodiments may support multiple simultaneous streams. When a message transfer fails midway during transport, the message transfer may be restarted from a point of failure in the stream, without having to restart at a beginning of the message transfer. This capability may decrease network traffic due to retransmissions in networks with poor communication qualities.

B2B file transfers may contain sensitive information. By streaming messages through intermediate servers in a chain of servers without storing the message on the intermediate server, security may be enhanced. Cost and design complexity may be decreased by eliminating access control mechanisms associated with intermediate file storage.

The apparatus 100 may include a first server 124 to receive a first stream of packets, including perhaps the first stream of HTTP packets 140. The first stream of HTTP packets 140 may comprise a first data message 144 and a first control message 148. The first control message 148 may comprise one or more operands capable of interpretation by the first business logic module 116. Both the first data message 144 and the first control message 148 may be encoded in a computing platform independent protocol, including perhaps SOAP. A SOAP decoder module 152 may be coupled to a first HTTP module 156 within the first server 124. The SOAP decoder module 152 may extract the first data message 144 from the SOAP while receiving the first stream of HTTP packets 140. A storage subsystem 158 may be coupled to the first server 124 to store the first data message 144 while receiving the first stream of HTTP packets 140.

The first HTTP module 156 may convert the first control message 148 to a business logic object model format. The business logic object model format may comprise a result of deserializing a message stream in an object format capable of being understood and processed by the first business logic module 116. The first business logic module 116 may be coupled to the first HTTP module 156 to receive the first control message 148. The first business logic module 116 may invoke a first business method using the first control message 148 after completion of the storage operation associated with the first data message 144. The first business method may comprise an acknowledgement 159 to be sent back to the business logic client 106 to indicate that the first data message 144 was successfully received. The acknowledgement 159 may comprise an email message, among other forms. Other business methods (e.g., sending emails and performing data transformations) may be decoded from the first stream of HTTP packets 140 and invoked by the first business logic module 116.

The first business logic module 116 may also receive a download request message 160. The first business logic module 116 may read a second data message 164 from the storage subsystem 158 in response to the download request message 160. A SOAP encoder module 168 may be coupled to the first business logic module 116. The SOAP encoder module 168 may encode the second data message 164 in the SOAP while reading the second data message 164 from the storage subsystem 158. A resulting SOAP-encoded second data message may be transmitted to the business logic client 106 as a second stream of HTTP packets 169. The transmission may occur as the second data message 164 is being read from the storage subsystem 158.

The apparatus 100 may also include a second HTTP module 170 within the second server 128. The second HTTP module 170 may be coupled to the first HTTP module 156, and may receive the first stream of HTTP packets 140 before the first stream of HTTP packets 140 is received at the first server 124. The second HTTP module 170 may retransmit the first stream of HTTP packets 140 from the second server 170 to a next server 172 in a chain of servers 174, to the first server 124, or to both. The first stream of HTTP packets 140 may be retransmitted without storing the first stream of HTTP packets 140 on disk at the second server 128 or on any server in the chain of servers 174. The second server 128 and any server in the chain of servers 174 may be located in a networking demilitarized zone.

The second HTTP module 170 may decode the first stream of HTTP packets 140, or a portion thereof. The second HTTP module 170 may extract a second control message 176 embedded in the first stream of HTTP packets 140, and may perhaps forward the second control message 176 to the second business logic module 120. The second business logic module 120 may invoke a second business method using the second control message 176.

In another embodiment, a system 180 may include one or more of the apparatus 100, as previously described. The system 180 may also include a processor 184 coupled to the first server 124 to process the first stream of HTTP packets 140, the second stream of HTTP packets 169, or both. A memory 188 may be coupled to the processor 184 to temporarily store parameters associated with the processing of the first stream of HTTP packets 140, the second stream of HTTP packets 169, or both. The memory 188 may comprise, without limitation, a dynamic random-access memory, a flash memory, and an electrically-alterable read-only memory, among other types.

Any of the components previously described can be implemented in a number of ways, including embodiments in software. Thus, apparatus 100; business logic client 106; network 112; business logic modules 116, 120; servers 124, 128, 172, 174; HTTP packets 140, 169; data messages 144, 164; control messages 148, 176; SOAP decoder module 152; HTTP modules 156, 170; storage subsystem 158; acknowledgement 159; download request message 160; SOAP encoder module 168; system 180; processor 184; and memory 188 may all be characterized as "modules" herein.

The modules may include hardware circuitry, single or multi-processor circuits, memory circuits, software program modules and objects, firmware, and combinations thereof, as desired by the architect of the apparatus 100 and system 180 and as appropriate for particular implementations of various embodiments.

The apparatus and systems of various embodiments can be used in applications other than streaming SOAP-encoded messages and files across an enterprise network. Thus, various embodiments of the invention are not to be so limited. The illustrations of apparatus 100 and system 180 are intended to provide a general understanding of the structure of various embodiments. They are not intended to serve as a complete description of all the elements and features of apparatus and systems that might make use of the structures described herein.

Applications that may include the novel apparatus and systems of various embodiments include high-speed computers, communication and signal processing circuitry, modems, single or multi-processor modules, single or multiple embedded processors, data switches, and application-specific modules, including multilayer, multi-chip modules. Such apparatus and systems may be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, and others. Some embodiments may include a number of methods.

Figure 2A:
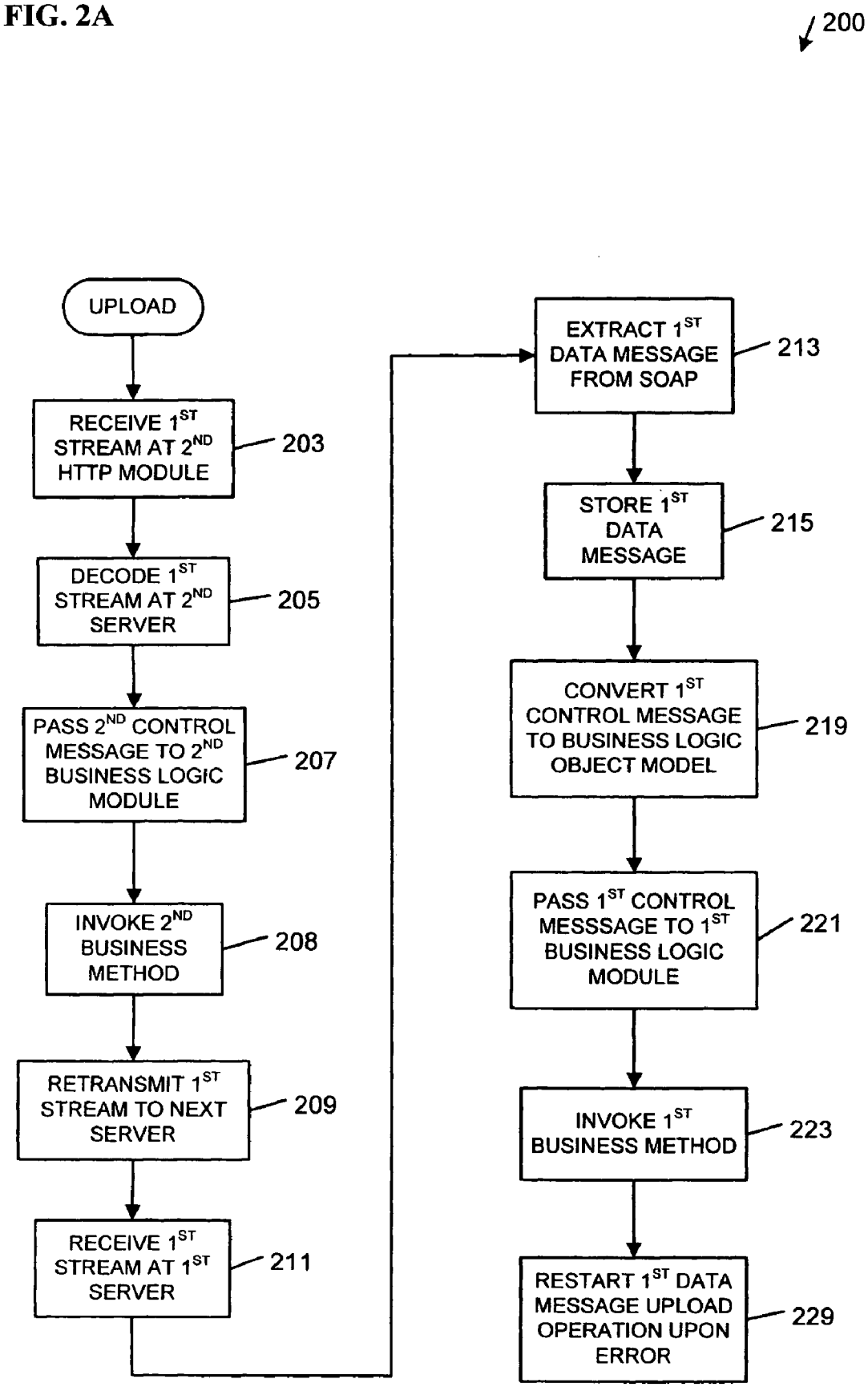
FIGS. 2A and 2B are flow diagrams illustrating several methods according to various embodiments of the invention.
Figure 2B:
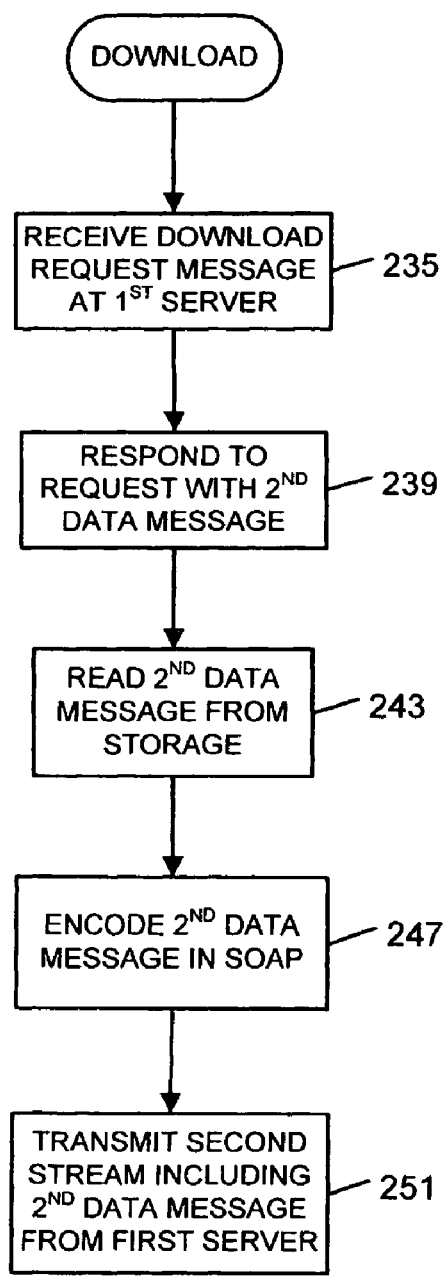

FIGS. 2A and 2B are flow diagrams illustrating several methods according to various embodiments of the invention. A method 200 may begin at block 203 with receiving a first stream of packets, including perhaps a first stream of HTTP packets. The first stream of HTTP packets may be received at a second HTTP module within a second server before receiving the first stream of HTTP packets at a first server. The first stream of HTTP packets may comprise a first data message and first and second control messages. Any or all of these messages may be encoded in a computing platform independent protocol message, including perhaps a SOAP message.

The method 200 may continue at block 205 with decoding the first stream of HTTP packets, or a portion thereof, at the second server using the second HTTP module. The second control message embedded in the first stream of HTTP packets may be passed from the second HTTP module to a second business logic module, perhaps located within the second server, at block 207. The second business logic module may invoke a second business method using the second control message, at block 208.

The method 200 may continue at block 209 with retransmitting the first stream of HTTP packets from the second server to a next server in a chain of servers, to the first server, or to both. The first stream of HTTP packets may be retransmitted without storing the first stream of HTTP packets on disk at the second server or at any server in the chain of servers other than the first server. It is noted that the first server may comprise a destination point for the first stream of packets.

The method 200 may also include receiving the first stream of HTTP packets at the first server, at block 211. The first stream of HTTP packets may be received at a first HTTP module within the first server. The first data message may be extracted from the SOAP using a SOAP decoder module, at block 213. The extraction may occur while receiving the first stream of HTTP packets. The method 200 may continue at block 215 with storing the first data message, perhaps in a storage subsystem while receiving the first stream of HTTP packets.

The method 200 may further include converting the first control message to a business logic object model format using the first HTTP module, at block 219. The first control message may be passed from the first HTTP module to a first business logic module, at block 221. The first business logic module may invoke a first business method using the first control message, at block 223. The first business method may comprise acknowledging a receipt of the first data message and/or sending an email message, among other methods. Activities associated with blocks 219-223 may occur after completion of the storing activity of block 215.

The method 200 may also include restarting an upload operation associated with the first data message, at block 229. The upload operation may be restarted from a point within the first data message corresponding to an occurrence of a communication error at that point in the message. The point of restart may comprise a byte count into the first data message measured from a start of the message.

The method 200 may also include download operations, as shown in FIG. 2B. A download request message encoded in the SOAP may be received at the first server, perhaps at the first business logic module, at block 235. The method 200 may include responding to the download request message with a second data message, at block 239. The second data message may also be SOAP-encoded.

The method 200 may further include reading the second data message from the storage subsystem using the first business logic module, at block 243. The second data message may be encoded in the SOAP using a SOAP encoder module, at block 247. The encoding may occur while reading the second data message from the storage subsystem. The method 200 may conclude at block 251 with transmitting a second stream of HTTP packets comprising the second data message from the first server. The second stream may be transmitted while reading the second data message from the storage subsystem.

The first stream of HTTP packets, the second stream of HTTP packets, or both may conform to a base64 encoding format, a SOAP message transmission optimization method (MTOM), a multipurpose internet mail extension (MIME) format, and a direct internet message encapsulation (DIME) format, among other data formats and encoding types.

It may be possible to execute a subset of the activities described herein, or to execute the activities in an order other than the order described. And, various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

Figure 3:
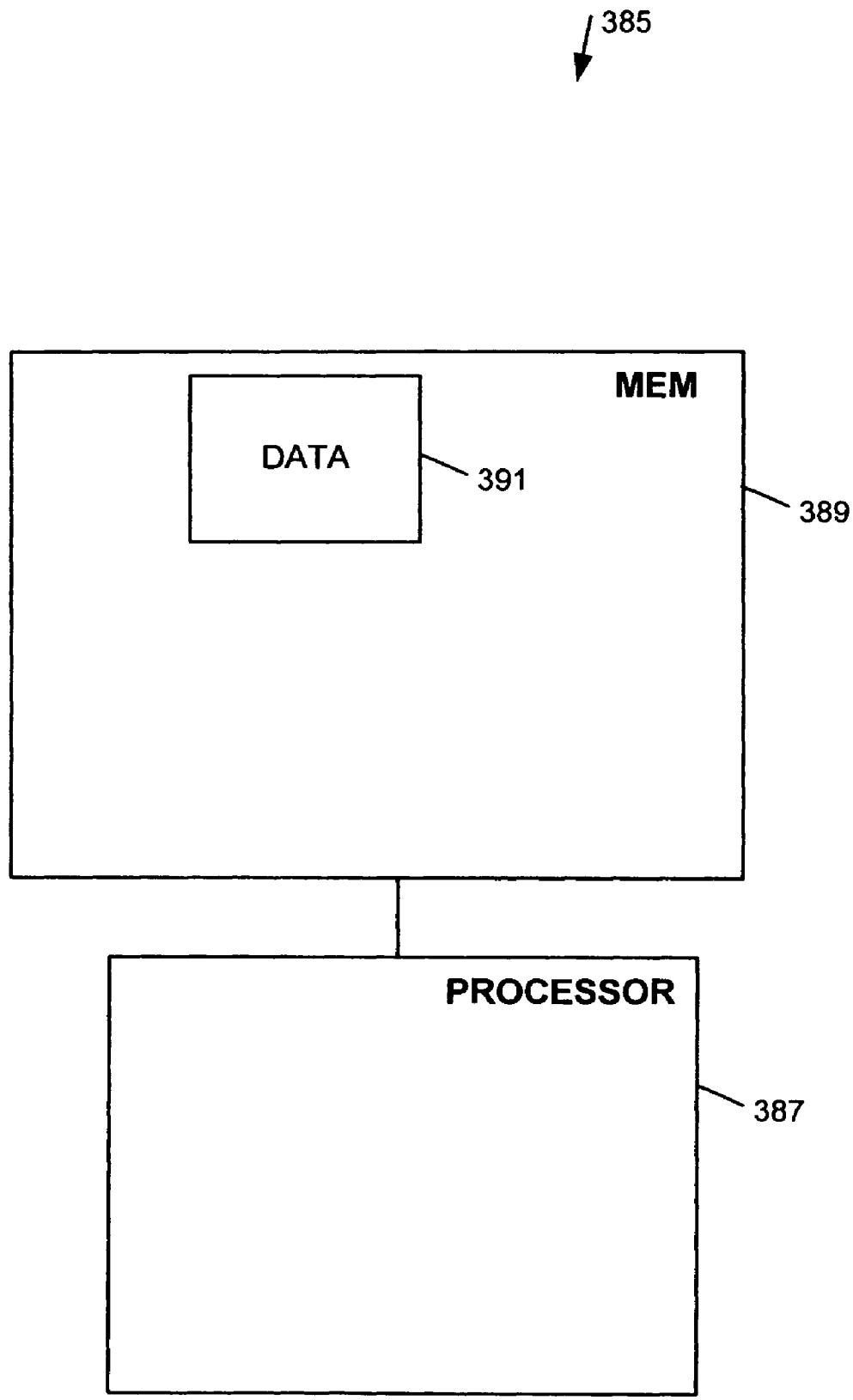
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the processor 387) performing the activities previously described.

The apparatus, systems, and methods disclosed herein may operate to stream a SOAP-encoded message or file across one or more intermediate servers, through a network. The message may be streamed through the network without requiring storage on disk. Upon reaching an endpoint server, the message may be stored on disk while being received and decoded. Larger message sizes, increased scalability, and enhanced security may result.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method, including:

receiving a first stream of packets at a first server, the first stream of packets comprising a first data message and a first control message, both the first data message and the first control messages encoded in a computing platform independent protocol, wherein the first stream of packets comprises a first stream of hypertext transport protocol (HTTP) packets received at a first HTTP module within the first server and wherein the computing platform independent protocol comprises a simple object access protocol (SOAP);

extracting the first data message from the computing platform independent protocol using a computing platform independent protocol decoder module while receiving the first stream of packets;

storing the first data message while receiving the first stream of packets;

converting the first control message to a business logic object model format using the first HTTP module;

passing the first control message from the first HTTP module to a first business logic module; and invoking a first business method at the first business logic module using the first control message.

2. The method of claim 1, executed after completion of the storing activity.

3. The method of claim 1, further including:

restarting an upload operation associated with the first data message from a point within the first data message corresponding to an occurrence of a communication error, the point within the first data message comprising a byte count into the first data message measured from a start of the first data message.

4. The method of claim 1, further including:

receiving the first stream of HTTP packets at a second HTTP module within a second server before receiving the first stream of HTTP packets at the first server;

retransmitting the first stream of HTTP packets from the second server to at least one of a next server in a chain of servers and the first server without storing the first stream of HTTP packets on disk at the second server.

5. The method of claim 4, further including:

decoding the first stream of HTTP packets at the second server using the second HTTP module;

passing a second control message embedded in the first stream of HTTP packets from the second HTTP module to a second business logic module; and invoking a second business method at the second business logic module using the second control message.

6. The method of claim 1, further including:

receiving a download request message encoded in the SOAP at the first server; and responding to the download request message with a second data message, wherein the second data message is SOAP-encoded.

7. The method of claim 6, wherein the second stream of HTTP packets is received at the first business logic module within the first server.

8. The method of claim 7, further including:

reading the second data message from the storage subsystem using the first business logic module;

encoding the second data message in the SOAP using a SOAP encoder module while reading the second data message from the storage subsystem; and transmitting a second stream of HTTP packets from the first server while reading the second data message from the storage subsystem, wherein the second stream of HTTP packets comprises the SOAP-encoded second data message.

9. The method of claim 8, wherein at least one of the first stream of HTTP packets, the second stream of HTTP packets, and the third stream of HTTP packets conforms to at least one of a base64 encoding format, a SOAP message transmission optimization method (MTOM), a multipurpose internet mail extension (MIME) format, and a direct internet message encapsulation (DIME) format.

10. An article including a machine-accessible medium having associated information, wherein the information, when accessed, results in a machine performing:

receiving a first stream of packets at a first server, the first stream of packets comprising a first data message and a first control message, both the first data message and the first control messages encoded in a computing platform independent protocol, wherein the first stream of packets comprises a first stream of hypertext transport protocol (HTTP) packets and wherein the computing platform independent protocol comprises a simple object access protocol (SOAP);

extracting the first data message from the computing platform independent protocol using a computing platform independent protocol decoder module while receiving the first stream of packets;

storing the first data message while receiving the first stream of packets;

converting the first control message to a business logic object model format using a first HTTP module;

passing the first control message from the first HTTP module to a first business logic module; and invoking a first business method at the first business logic module using the first control message.

11. The article of claim 10, wherein the first business method comprises acknowledging a receipt of the first data message.

12. The article of claim 10, wherein the first business method comprises sending an email message.

13. An apparatus, including:

a first server to receive a first stream of packets comprising a first data message and a first control message, both the first data message and the first control messages encoded in a computing platform independent protocol, wherein the first stream of packets comprises a first stream of hypertext transport protocol (HTTP) packets and wherein the computing platform independent protocol comprises a simple object access protocol (SOAP);

a storage subsystem coupled to the first server to store the first data message while receiving the first stream of packets;

a first HTTP module within the first server to convert the first control message to a business logic object model format; and a SOAP decoder module coupled to the first HTTP module to extract the first data message from the SOAP while receiving the first stream of HTTP packets.

14. The apparatus of claim 13, further including:

a first business logic module coupled to the first HTTP module to receive the first control message, to invoke a first business method using the first control message after completion of the storage operation, to receive a download request, and to read a second data message from the storage subsystem in response to the download request.

15. The apparatus of claim 14, further including:

a SOAP encoder module coupled to the first business logic module to encode a second data message in the SOAP while reading the second data message from the storage subsystem.

16. The apparatus of claim 13, further including:

a second HTTP module within a second server coupled to the first HTTP module to receive the first stream of HTTP packets before the first stream of HTTP packets is received at the first server, to retransmit the first stream of HTTP packets from the second server to at least one of a next server in a chain of servers and the first server without storing the first stream of HTTP packets on disk at the second server, to decode the first stream of HTTP packets at the second server, and to extract a second control message embedded in the first stream of HTTP packets.

17. The apparatus of claim 16, wherein the second server is located in a networking demilitarized zone.

18. The apparatus of claim 16, further including:

a second business logic module to invoke a second business method using the second control message.

19. A system, including:

a first server to receive a first stream of packets comprising a first data message and a first control message, both the first data message and the first control messages encoded in a computing platform independent protocol, wherein the first stream of packets comprises a first stream of hypertext transport protocol (HTTP) packets, and wherein the computing platform independent protocol comprises a simple object access protocol (SOAP); and a storage subsystem coupled to the first server to store the first data message while receiving the first stream of packets;

a processor coupled to the first server to process the first stream of packets;

a dynamic random-access memory coupled to the processor to temporarily store a parameter associated with the processing of the first stream of packets;

a first HTTP module within the first server to convert the first control message to a business logic object model format; and a SOAP decoder module coupled to the first HTTP module to extract the first data message from the SOAP while receiving the first stream of HTTP packets.

20. The system of claim 19, further including: a first business logic module coupled to the first HTTP module to receive the first control message and to invoke a first business method using the first control message after completion of the storage operation.

21. The system of claim 20, wherein the first business logic module comprises an extended markup language (XML) web services module.

* * * * *

UNITED STATES PATENT AND TRADEMARK OFFICE
CERTIFICATE OF CORRECTION

| | | |
|---|---|---|
| PATENT NO. | : 7,797,405 B2 | Page 1 of 1 |
| APPLICATION NO. | : 11/287607 | |
| DATED | : September 14, 2010 | |
| INVENTOR(S) | : Jeremy Morrissey et al. | |

It is certified that error appears in the above-identified patent and that said Letters Patent is hereby corrected as shown below:

In column 9, line 13, in claim 19, after "(SOAP);" delete "and".

Signed and Sealed this

Thirtieth Day of November, 2010

David J. Kappos
*Director of the United States Patent and Trademark Office*